United States Patent
Vetters

(10) Patent No.: US 7,278,830 B2
(45) Date of Patent: Oct. 9, 2007

(54) COMPOSITE FILLED GAS TURBINE ENGINE BLADE WITH GAS FILM DAMPER

(75) Inventor: Daniel K. Vetters, Indianapolis, IN (US)

(73) Assignee: Allison Advanced Development Company, Inc., Indianapolis, IN (US)

( * ) Notice: Subject to any disclaimer, the term of this patent is extended or adjusted under 35 U.S.C. 154(b) by 169 days.

(21) Appl. No.: 11/131,570

(22) Filed: May 18, 2005

(65) Prior Publication Data

US 2006/0263222 A1    Nov. 23, 2006

(51) Int. Cl.
*F01D 5/16* (2006.01)

(52) U.S. Cl. .................. 416/229 R; 416/500

(58) Field of Classification Search ............. 416/96 A, 416/97 A, 224, 227 R, 229 R, 232, 500
See application file for complete search history.

(56) References Cited

U.S. PATENT DOCUMENTS

| | | | |
|---|---|---|---|
| 4,376,004 A * | 3/1983 | Bratton et al. ........... 156/89.27 |
| 4,589,176 A | 5/1986 | Rosman et al. | |
| 5,165,860 A | 11/1992 | Stoner et al. | |
| 5,222,297 A | 6/1993 | Graff et al. | |
| 5,314,309 A | 5/1994 | Blakeley et al. | |
| 5,605,441 A | 2/1997 | Boszor et al. | |
| 6,039,542 A | 3/2000 | Schilling et al. | |
| 6,224,341 B1 | 5/2001 | Fricke | |
| 6,233,823 B1 | 5/2001 | Schilling | |
| 6,282,786 B1 | 9/2001 | Evans et al. | |
| 6,283,707 B1 | 9/2001 | Chin | |
| 6,471,484 B1 | 10/2002 | Crall | |
| 6,514,040 B2 * | 2/2003 | Lewis et al. ................. 415/119 |
| 6,532,658 B2 | 3/2003 | Schreiber | |
| 6,607,359 B2 | 8/2003 | von Flotow | |
| 6,669,447 B2 | 12/2003 | Norris et al. | |
| 6,705,383 B2 * | 3/2004 | Beeck et al. ................ 164/76.1 |
| 6,709,230 B2 * | 3/2004 | Morrison et al. ........... 415/115 |
| 7,080,971 B2 * | 7/2006 | Wilson et al. ................. 416/92 |
| 2001/0029668 A1 | 10/2001 | Schreiber | |
| 2001/0033793 A1 | 10/2001 | Lewis et al. | |
| 2002/0090302 A1 | 7/2002 | Norris et al. | |
| 2002/0122725 A1 | 9/2002 | Daam et al. | |
| 2002/0159882 A1 | 10/2002 | Crall | |
| 2002/0164253 A1 | 11/2002 | von Flotow | |
| 2003/0017053 A1 | 1/2003 | Baldwin et al. | |

FOREIGN PATENT DOCUMENTS

WO    WO 01/49975 A1    7/2001

* cited by examiner

*Primary Examiner*—Edward K. Look
*Assistant Examiner*—Devin Hanan
(74) *Attorney, Agent, or Firm*—Krieg DeVault, LLP

(57) ABSTRACT

A gas turbine engine blade comprises a housing, a composite core located within the housing, and a gas damper located within the housing for damping vibration of the blade.

20 Claims, 5 Drawing Sheets

COMPOSITE FILLED GAS TURBINE ENGINE BLADE WITH GAS FILM DAMPER

FIELD OF THE INVENTION

The present invention relates generally to the field of gas turbine engine components. More specifically, in one form the present invention relates to an organic matrix composite filled gas turbine engine blade and a method of making the blade.

BACKGROUND

Many gas turbine engines include an axial flow turbine and compressor that include a number of rotatable disks/rotors. Each of the rotatable disks/rotors carries around their periphery an array of radially extending blades for interaction with a working fluid. Further, many gas turbine engines include a fan stage which includes a plurality of radially extending blades.

The compressor is utilized to pressurize a working fluid to be mixed with fuel and burned in the combustor to produce a high temperature exhaust gas. The high temperature exhaust gas is expanded as it passes through the turbine and work is extracted through rotation of the bladed disks/rotors. Engineers designing gas turbine engines recognize that the possible effects of vibration must be addressed. Vibration which can take on a number of different modes if left unchecked can lead to the reduction in blade life.

The present application provides a novel and non-obvious way of damping vibration in a composite filled gas turbine engine blade.

SUMMARY

One form of the present invention contemplates a gas turbine engine airfoil comprising: a housing; a composite core located within the housing, the composite core including a fiber reinforcement portion and a matrix material portion; and, a gas damper located between the housing and the composite core for damping vibration of the airfoil.

Another form of the present invention contemplates a gas turbine engine blade comprising: a blade shell comprising an internal cavity and a side opening; a fiber-reinforced core attached to the blade shell and substantially filling the internal cavity; a sidewall member attached to the blade shell and at least partially closing the side opening, the sidewall member and the blade shell defining an outer surface including an airfoil portion; and a gas film damper located between the core and the sidewall member.

Yet another form of the present invention contemplates a method of making a gas turbine engine blade. The method comprising: placing a fiber preform through an open side of a blade shell into an internal cavity of the blade shell; introducing a matrix material through the open side of the blade shell into the internal cavity to impregnate the fiber preform and define a composite core; creating a location for a gas film damper adjacent the composite core; attaching a sidewall member to the shell to cover at least a portion of the open side; and establishing a gas film damper within the location between the core and the sidewall.

DESCRIPTION OF THE ILLUSTRATIVE EMBODIMENTS

Figure 1:
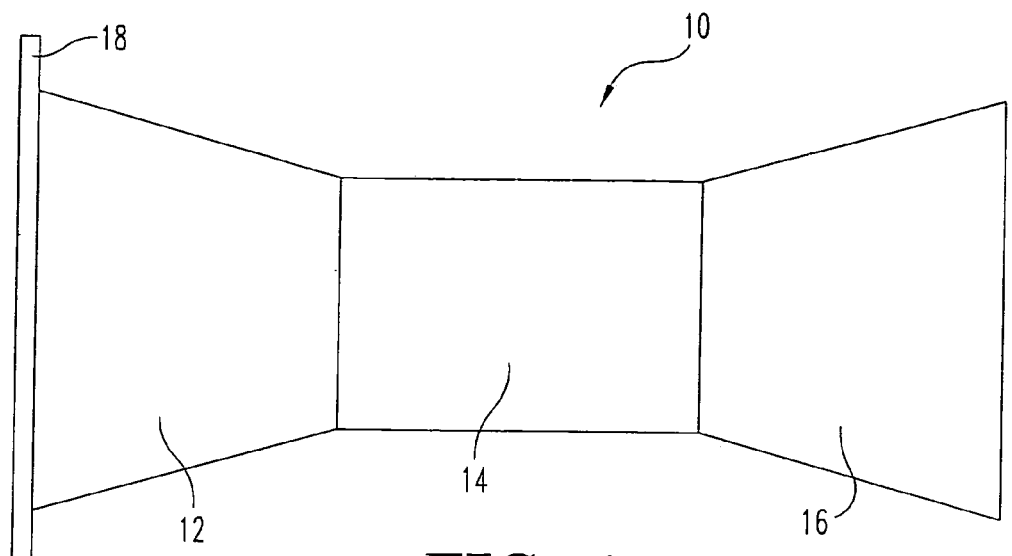
FIG. 1. is an illustrative block diagram of a gas turbine engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1. there is illustrated a schematic representation of a gas turbine engine 10. This non-limiting depiction of a gas turbine engine 10 includes a compressor section 12, a combustor section 14, and a turbine section 16. The gas turbine engine 10 may also include a fan section 18. Gas turbine engines contemplated herein are particularly applicable for, but not limited to, flight propulsion systems for aircraft. However, it should be understood that the present inventions are applicable with virtually all types and configurations of gas turbine engines and are not intended to be limited to the general schematic drawing of the engine set forth in FIG. 1.

It should be understood that the term "aircraft" is generic and is meant to include helicopters, airplanes, missiles, unmanned space devices, transatmospheric vehicles and other substantially similar devices. It is also important to realize there is a multitude of ways in which the gas turbine engine components can be linked together to produce an engine. For instance, additional compressors and turbine stages could be added with intercoolers connecting between the compressor stages. Additionally, although the gas turbine engine 10 has been described for use with an aircraft, it should be understood that gas turbine engines are also suited to be used in industrial applications, such as, for example, pumping sets for gas and oil transmission lines, electricity generation, and/or naval propulsion. Further, a gas turbine engine has application in propelling motor vehicles.

Figure 2:
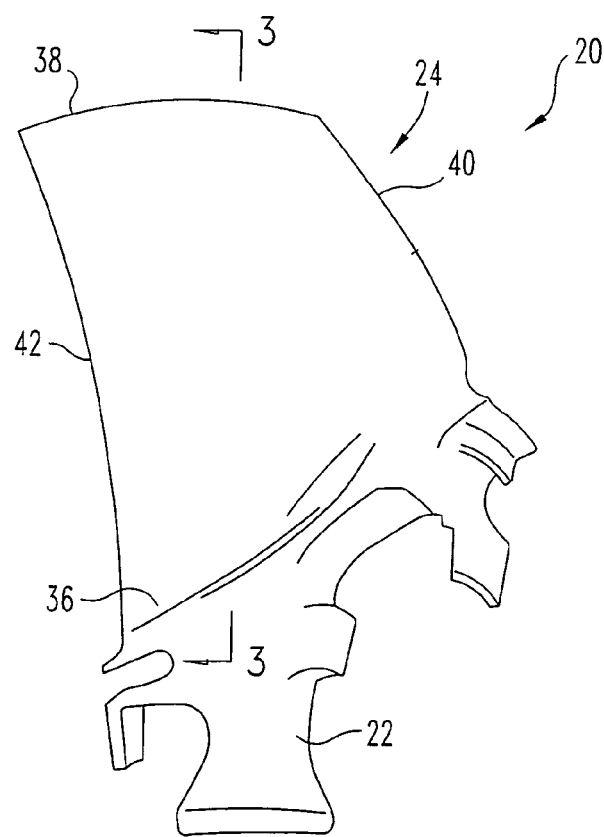
FIG. 2 is an illustrative view of a portion of a blisk including one embodiment of a gas turbine engine blade of the present invention.
Figure 2A:
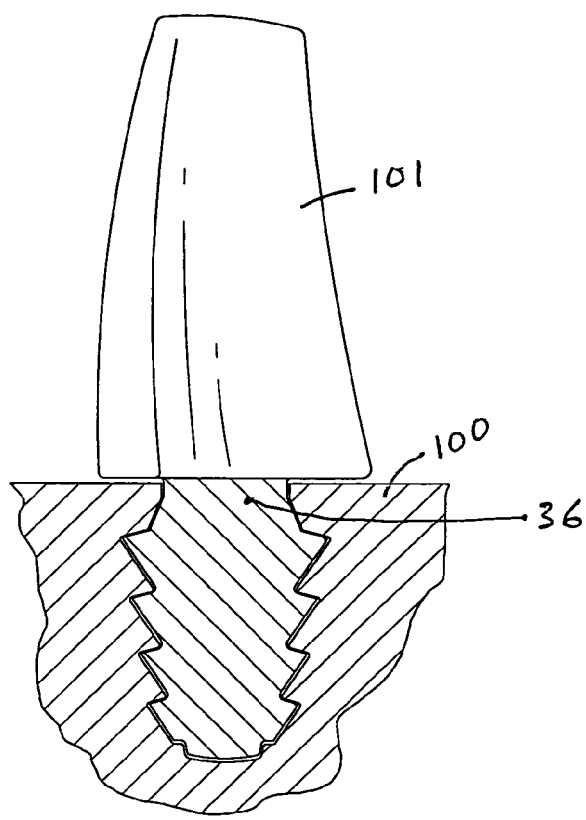
FIG. 2a is an illustrative view of a portion of a rotor including one embodiment of a removable gas turbine engine blade of the present invention.

With reference to FIG. 2, there is illustrated one embodiment of a portion of a rotor 20. The rotor 20 may be located within the compressor section 12, turbine section 16 or fan section 18 and include a plurality of blades 24. Each of the compressor section 12, turbine section 16 or fan section 18 includes a plurality of blades. The rotor 20 may take one of many forms including but not limited to: an integrally bladed disk, often referred to as a blisk such as in the example of FIG. 2; and a disk/wheel 100 including a plurality of removable blades 101 such as depicted in the example of FIG. 2a. Further, the present invention also contemplates application with stator vanes within the gas turbine engine. The term airfoil may be used herein to refer to blades and/or vanes unless specifically provided to the contrary.

While the present invention will be descried with reference to a blade 24 from a blisk it is not meant to be limiting and the present invention is applicable to all types of blades regardless of how they are coupled/connected to the rotatable structure. Further, the present invention may also be applicable to vanes. The rotor 20 includes a disk 22 and a plurality of composite filled blades 24, one of which is illustrated in FIG. 2. The disk 22 and the blades 24 may take a variety of shapes different from the embodiment illustrated in FIG. 2.

Figure 3:
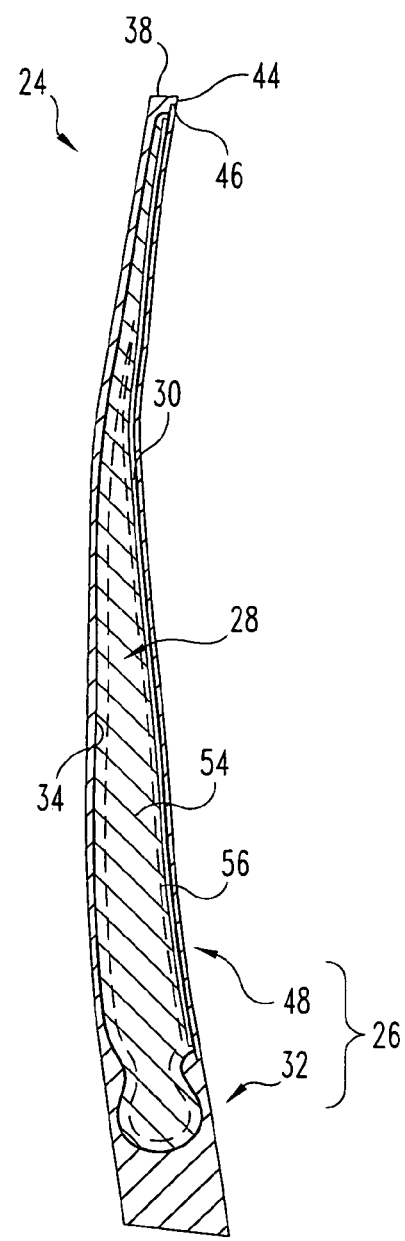
FIG. 3 is an illustrative sectional view taken along lines 3-3 of FIG. 2 illustrating one form of the reinforced gas turbine engine blade comprising a fiber reinforced composite core and a gas film damper for damping vibration.

With reference to FIG. 3, there is illustrated one embodiment of the blade 24 removed or decoupled from the disk 22. The blade 24 includes a housing 26, a composite core 28 located within the housing 26, and a gas damper 30 located within the housing 26 for damping vibration of the blade 24. In one form the composite core 28 has a relatively high strength to weight ratio. In one form the composite core has approximately twice the strength to weight ratio of solid titanium. However, composite cores having other strength to weight ratios are contemplated herein.

A shell 32 of the housing 26 is formed to include a cavity 34 in which the core 28 is located. The housing 26 in one form includes an airfoil portion having a suction surface and a pressure surface. The shell 32 provides the blade 24 with a root 36, a tip 38 and leading and trailing edges 40, 42 (FIG. 2). In the form illustrated in FIG. 2, the rotor 24 is a blisk such that the root 36 is attached to the disk 22 in a unitary manner. In another form illustrated in FIG. 2a the root 36 of removable blade 101 is coupled to the disk/wheel 100 by use of interengaging mechanical structure, for example, a fir tree, a dovetail arrangement, or other attachment mechanisms known to those of ordinary skill in the art. In one form the shell 32 has a generally C-shaped cross-section such that the shell 32 has an open side 44 for receiving materials of the core 28 through a side opening 46.

A sidewall 48 of housing 26 is attached to the open side 44 of the shell 32 to at least partially close the side opening 46. The sidewall 48 thus acts as a closure for the housing 26. In one form illustrated in FIG. 3, the sidewall 48 completely closes the side opening 46. In another form, the sidewall 48 is configured to allow one or more portions of the side opening 46 to remain open to allow, for example, venting of the gas within the gas damper 30. The gas damper 30 may thus be vented or un-vented.

Figure 4:
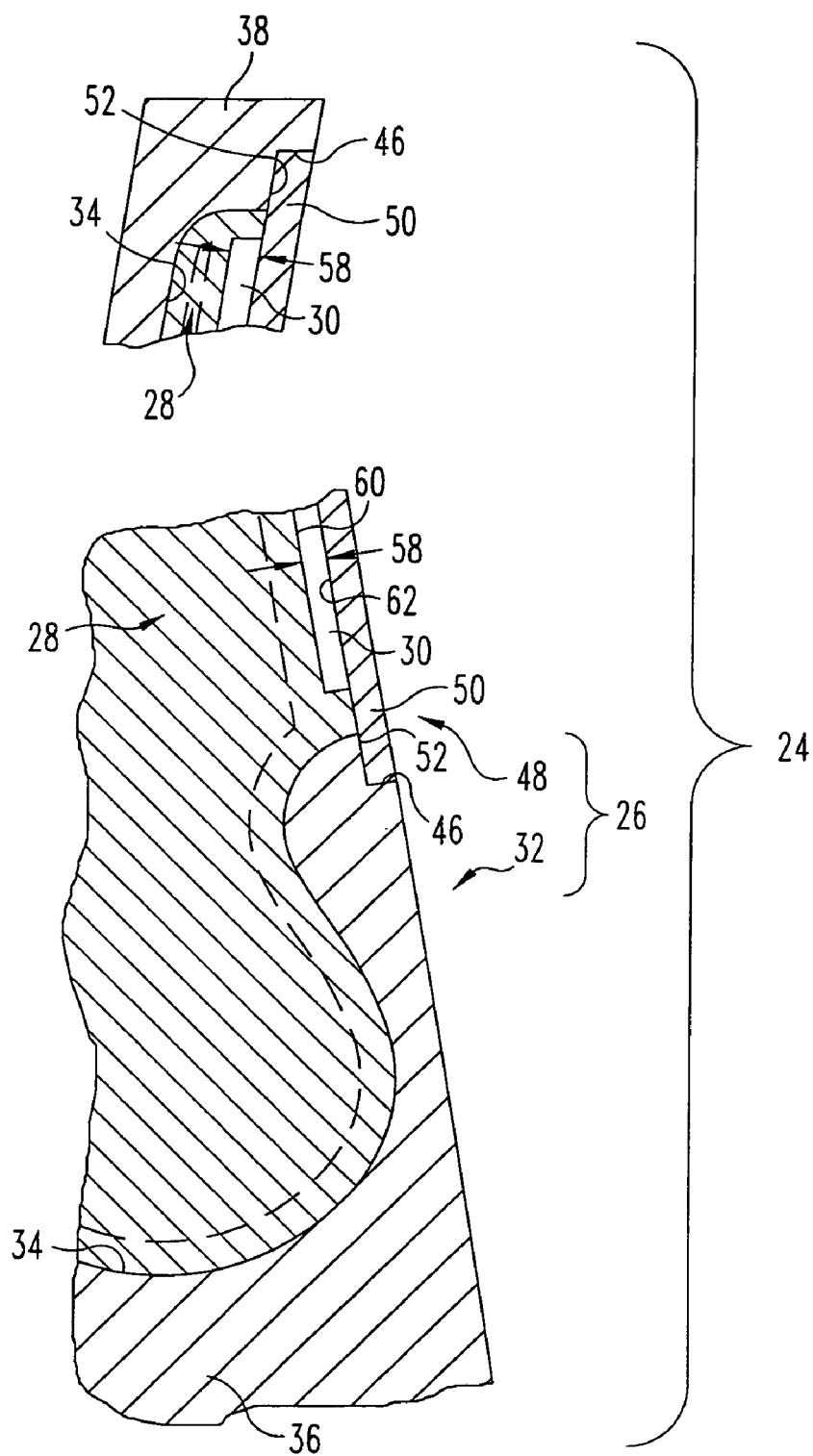
FIG. 4 is an enlarged fragmentary sectional view of the gas turbine engine blade of FIG. 3.

In a preferred form the sidewall 48 is attached to the shell 32 but not to the core 28. With reference to FIG. 4, there is illustrated one embodiment of the sidewall 48 being configured, for example, as a plate member having a peripheral portion 50 attached to a recessed portion 52 of the shell open side 44 by a suitable attachment mechanism (e.g., adhesive bond, welding). In one form the sidewall 48 is attached to the shell 32 by electron beam welding. However, it is within the scope of this disclosure to attach the sidewall 48 to the core 28.

The sidewall 48 and side opening 46 are illustrated as being located on the pressure side of the blade 24. It is within the scope of this disclosure for the sidewall 48 and side opening 46 to be located on the suction side of the blade 24 and/or on both sides of the blade.

In one embodiment of the present invention the shell 32 and the sidewall 48 are made of a metallic material, which can be an elemental material, alloy or superalloy. The shell 32 and sidewall member 48 are contemplated as being formed by casting, machining, working wrought materials and/or fabrication from metallic materials. In one form the metallic materials are selected from, but not limited to, titanium, nickel or cobalt alloys, however other materials are contemplated herein. The present application contemplates that the shell 32 and sidewall member 48 can be formed of other materials including, but not limited to ceramic and intermetallic materials. Further, the present application contemplates that the shell 32 and sidewall member 48 may be formed of the same or dissimilar materials.

Figure 5:
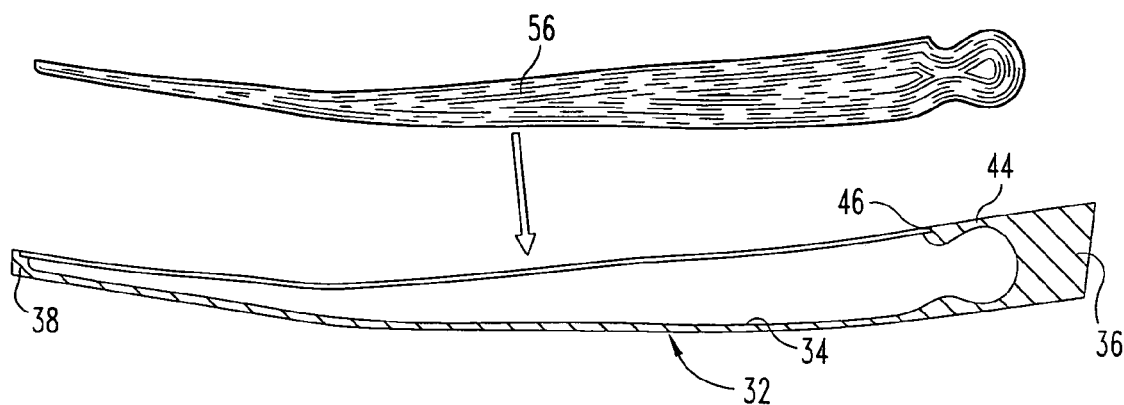
FIG. 5 is an illustrative sectional view illustrating one embodiment of introducing a fiber preform through a side opening of the blade shell.

In one form the core 28 is made of a relatively high strength-to-weight ratio, fiber-reinforced matrix composite material that fills the cavity 34 to strengthen and/or stiffen the blade 24. The cavity 34 may contain some voids/regions that the core 28 does not fill. The core 28 includes a matrix material 54 that is internally reinforced by an embedded fiber preform 56. The fiber preform includes a plurality of fibers 56a (FIG. 5). The fiber preform 56 illustrated in FIG. 5 is only one non-limiting embodiment and other fiber arrangements are contemplated herein. In one form the fiber preform is formed from fiber mesh sheet material that is cut to shape and layer wise stacked together. In another form the fiber preform comprises a porous body structure that may be made of fiber pieces and/or fiber sections.

In one form, the matrix material is an organic matrix material. In another form, the matrix material 54 is an aluminum matrix material. In yet another form, the matrix material 54 is a magnesium matrix material. In general, each of an organic matrix, a metallic matrix, and a ceramic matrix is within the scope of the present application. The matrix material is introduced into the fiber preform 56 and may completely or partially fill any space within the preform 56 between the plurality of fibers 56a. In one form the matrix material completely fills any spaces between the plurality of fibers within the fiber preform.

With reference back to FIG. 4, there is illustrated an enlarged view of one embodiment of the gas damper 30. In one exemplarily, but non-limiting embodiment, the gas damper 30 includes a film of gas (e.g., air) located between the core 28 and the sidewall 48. However, other materials are contemplated herein for the gas damper 30 including, but not limited to argon or nitrogen. The gas damper 30 fills a gap 58 that is formed between a surface 60 of the core 28 and an inner surface 62 of the sidewall 48 facing the core surface 60. In one form the gap 58 extends along the core 28 and the sidewall 48 between the root 36 and tip 38 and between the leading and trailing edges 40, 42. The core surface 60 forms a portion of the gap 58 that receives the gas damper 30. The gap 58 may cover a portion or substantially the entire region between the root 36 and tip 38 and between the leading and trailing edges 40 and 42. The gap 58 between the core 28 and the sidewall 48 may be formed by machining the core 28, forming the core 28 to leave a void between the core 28 and sidewall 48 and/or by machining the inner surface of the sidewall 48.

Figure 6:
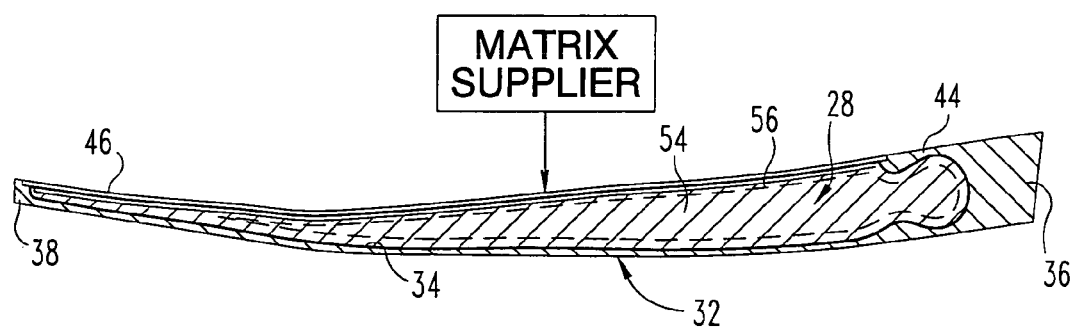
FIG. 6 is an illustrative sectional view illustrating one embodiment of introducing a matrix material through the side opening to impregnate the fiber preform with the matrix material to form a core.
Figure 7:
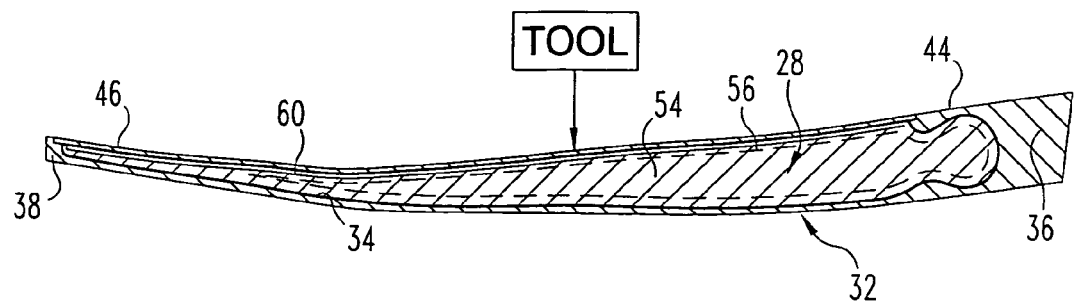
FIG. 7 is an illustrative sectional view of one embodiment of the present invention comprising an act of removing material from the core to form a recess defining the gas damper.

With reference to FIGS. 5-8, there is illustrated one method of making the blade 24. Fiber preform 56 is introduced through the side opening 46 into the cavity 34, as illustrated in FIG. 5. After the fiber preform 56 is positioned in the cavity 34, a matrix supplier 64 is operated to introduce the matrix material 54 through the side opening 46 into the cavity 34 to impregnate the fiber preform 56 with the matrix 54, as illustrated in FIG. 6. The present invention contemplates that the impregnation of the fiber preform 56 is not limited to a full fill of matrix material and may include a partial fill. As previously discussed the core surface 60 may be cast in place to a net or near net shape or may be machined by use of a tool 64 to provide the core surface 60 with the desired relief to define recess 58 when the sidewall 48 is installed, as illustrated in FIG. 7.

Figure 8:
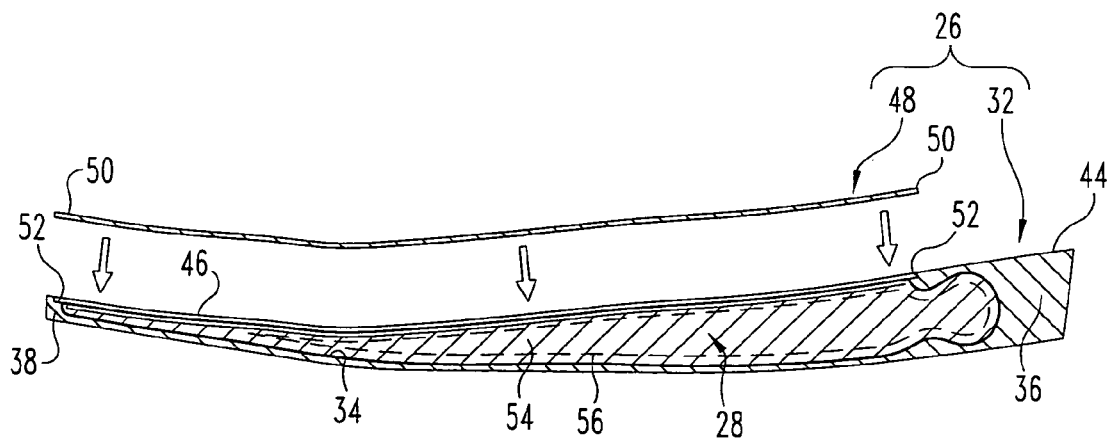
FIG. 8 is an illustrative sectional view illustrating attachment of a blade shell-sidewall member to the blade shell but not to the core.

The peripheral portion 50 of the sidewall 48 is then received in and attached to the recessed portion 52 of the shell open side 44 to attach the sidewall 48 to the shell 32 and at least partially close the side opening 46, as illustrated in FIG. 8. In one form a film of air which acts as the damper 30 is established in the gap 58 between the core 28 and the sidewall 48 upon attachment of the sidewall 48 to the shell 32.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine engine airfoil comprising:
   a housing;
   a composite core located within said housing, said composite core including a fiber reinforcement portion and a matrix material portion;
   a gas damper located between said housing and said composite core for damping vibration of the airfoil; and
   wherein said housing comprises a shell and a closure, said shell defines a cavity that said composite core is located in and includes an opening into said cavity, said closure is attached to said shell and at least partially closes said opening, and said gas damper is located between said closure and said composite core.

2. The gas turbine engine airfoil of claim 1, wherein said gas damper is located in a gap defined between said composite core and said housing, and wherein said gas damper including a gas that contacts said housing and said composite core.

3. The gas turbine engine airfoil of claim 1, wherein said gas damper is an air damper, and wherein the gas turbine engine airfoil is one of a fan blade, a compressor blade and a turbine blade.

4. The gas turbine engine airfoil of claim 1, wherein said shell has a substantially open side forming said opening; wherein said composite core includes a core surface facing said opening; and wherein said closure is a closure plate attached to said shell but not to said composite core and said closure plate has an outer surface that defines a portion of an outer surface of the airfoil.

5. The gas turbine engine airfoil of claim 1, wherein the gas turbine engine airfoil defines a gas turbine engine blade.

6. A gas turbine engine airfoil comprising:
   a housing;
   a composite core located within said housing, said composite core including a fiber reinforcement portion and a matrix material portion;
   a gas damper located between said housing and said composite core for damping vibration of the airfoil;
   wherein the gas turbine engine airfoil is a blade;
   wherein said housing comprises a shell having a cavity that said composite core is located in and a cover member, said shell having a sidewall member with an opening therein, and said cover member connected to said shell and at least partially closing said opening;
   wherein said gas damper is located between said cover member and said composite core, and said gas damper including a gas that contacts a surface of said composite core and a surface of said cover member;
   wherein said shell and said cover member are formed of a metallic material;
   wherein said matrix material portion is an organic matrix material; and
   wherein said housing having an airfoil shaped outer surface.

7. A gas turbine engine blade comprising:
   a blade shell comprising an internal cavity and a side opening;
   a fiber-reinforced core attached to said blade shell and substantially filling said internal cavity;
   a sidewall member attached to said blade shell and at least partially closing said side opening, said sidewall member and said blade shell defining an outer surface including an airfoil portion; and
   a gas film damper located between said core and said sidewall member.

8. The gas turbine engine blade of claim 7, wherein said gas film damper is an air film damper including air located in a gap formed between said core and said sidewall member; and
   wherein said sidewall member is not attached to said core.

9. The gas turbine engine blade of claim 7, wherein said shell comprises a root portion, a tip portion, a leading edge portion and a trailing edge portion;
   wherein said root portion is integrally formed with a rotor disk;
   wherein said sidewall member extends in a spanwise direction between said root portion and said tip portion and in a streamwise direction between said leading edge portion and said trailing edge portion; and
   wherein said gas film damper is an air damper located in a gap formed between said core and said sidewall member.

10. The gas turbine engine blade of claim 7, wherein said shell comprises a root portion, a tip portion, a leading edge portion and a trailing edge portion;
    wherein said root portion is not integrally formed with a rotor disk;
    wherein said sidewall member extends in a spanwise direction between said root portion and said tip portion and in a streamwise direction between said leading edge portion and said trailing edge portion; and wherein said gas film damper is an air damper located in a gap formed between said core and said sidewall member.

11. The gas turbine engine blade of claim 7, wherein said core including an organic matrix material.

12. The gas turbine engine blade of claim 11, wherein said core includes a fiber preform embedded with said organic matrix material.

13. The gas turbine engine blade of claim 7, wherein said core is one of a fiber-reinforced aluminum matrix material core and a fiber-reinforced magnesium matrix material core.

14. The gas turbine engine of claim 7, wherein said gas film damper is an air film damper including a quantity of air located in a gap formed between said core and said sidewall member;

wherein said sidewall member is not attached to said core;

wherein said shell comprises a root portion, a tip portion, a leading edge portion and a trailing edge portion;

wherein said sidewall member extends in a spanwise direction between said root portion and said tip portion and in a streamwise direction between said leading edge portion and said trailing edge portion; and wherein said core includes a fiber preform embedded with an organic matrix material.

15. A method of making a gas turbine engine blade, comprising:

placing a fiber preform through an open side of a blade shell into an internal cavity of the blade shell;

introducing a matrix material through the open side of the blade shell into the internal cavity to impregnate the fiber preform and define a composite core;

creating a location for a gas film damper adjacent the composite core;

attaching a sidewall member to the shell to cover at least a portion of the open side; and forming a gas film damper within the location between the core and the sidewall.

16. The method of claim 15, wherein said attaching comprises connecting the sidewall member to the blade shell but not to the core.

17. The method of claim 15, wherein said forming comprises providing a film of air spanning between the composite core and the sidewall member.

18. The method of claim 15, wherein said creating comprises making a recessed portion in the core, and said forming comprises receiving a gas within the recessed portion.

19. The method of claim 15, wherein said creating comprises removing material from the core.

20. The method of claim 15, wherein said creating comprises forming a near net shaped recessed portion in the core.

* * * * *